United States Patent
Shah-Nazaroff et al.

(10) Patent No.: US 6,317,881 B1
(45) Date of Patent: Nov. 13, 2001

(54) METHOD AND APPARATUS FOR COLLECTING AND PROVIDING VIEWER FEEDBACK TO A BROADCAST

(75) Inventors: Anthony A. Shah-Nazaroff, Santa Clara; Jean M. Goldschmidt Iki, San Jose; Kenneth A. Moore, Fremont; David N. Hackson, Sunnyvale; Eric O. Smith, Scotts Valley, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/186,302

(22) Filed: Nov. 4, 1998

(51) Int. Cl.[7] .................................................. H04N 7/173
(52) U.S. Cl. .................. 725/24; 725/23; 725/46
(58) Field of Search .................. 345/327; 348/1, 348/3, 10, 12, 13; 455/2, 3.1, 4.2, 5.1, 6.2, 6.3; 725/39, 45, 46, 47, 23, 24, 9–21; H04N 7/16, 7/173

(56) References Cited

U.S. PATENT DOCUMENTS

| 5,251,324 | 10/1993 | McMullan, Jr. ........................ 455/2 |
| 5,351,075 | 9/1994 | Herz et al. .............................. 348/1 |
| 5,481,294 | 1/1996 | Thomas et al. . |
| 5,539,822 | * 7/1996 | Lett .......................................... 380/20 |
| 5,732,216 | * 3/1998 | Logan et al. ...................... 395/200.33 |
| 5,758,257 | 5/1998 | Herz et al. ................................ 455/2 |
| 5,990,885 | 11/1999 | Gopinath .............................. 345/327 |
| 6,005,597 | * 12/1999 | Barrett et al. ............................ 348/1 |
| 6,209,130 | * 3/2001 | Rector, Jr. et al. ..................... 725/50 |

* cited by examiner

Primary Examiner—Chris Grant
(74) Attorney, Agent, or Firm—Blakely, Sokoloff, Taylor & Zafman LLP

(57) ABSTRACT

The present invention provides an improved method and apparatus to collect and provide viewer feedback to broadcasts. According to one aspect of the present invention, a rating is generated for a broadcast by a server system. The rating is based at least in part on viewer feedback to the broadcast, and the rating indicates a likelihood of interest in the broadcast for potential subsequent viewers. Access to the rating is then provided so that predications can be made as to whether or not the broadcast will be of interest to potential subsequent viewers. According to another aspect of the present invention, the rating is provided from the server system to an entertainment system, and the broadcast can be selected for viewing at an entertainment system based on the rating generated by the server system. In one embodiment, the viewer feedback is received at the entertainment system in response to a feedback questionnaire.

43 Claims, 9 Drawing Sheets

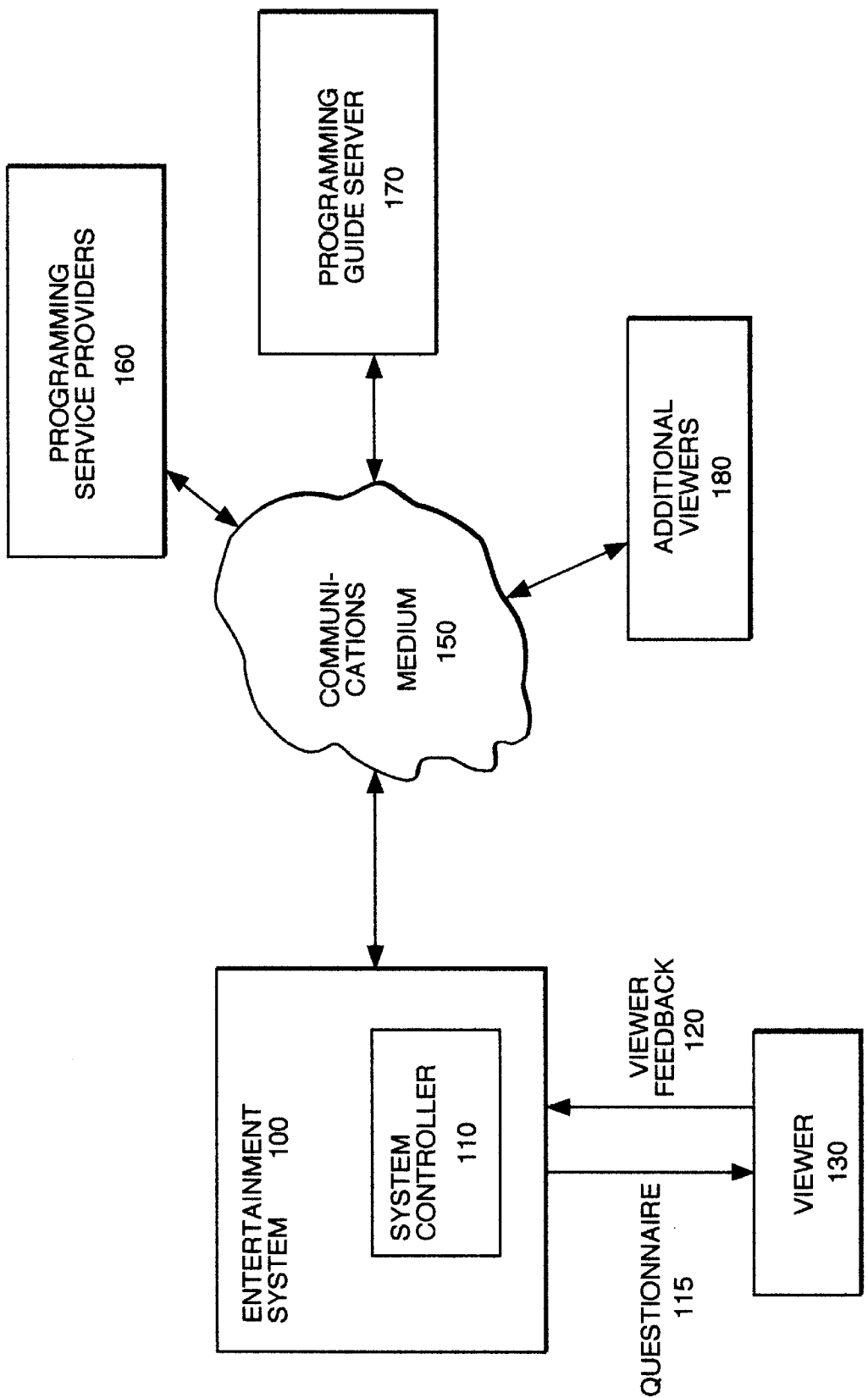

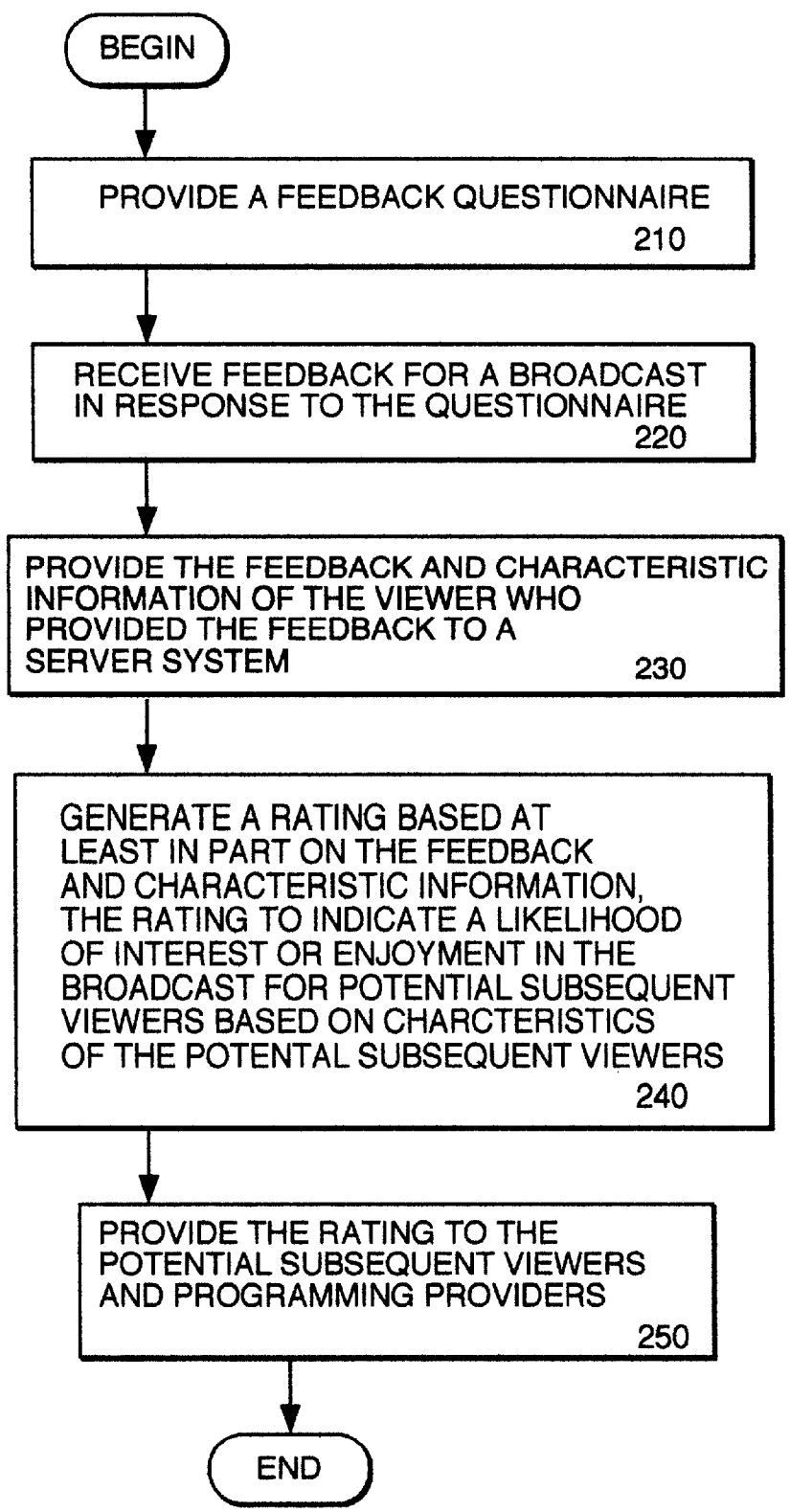

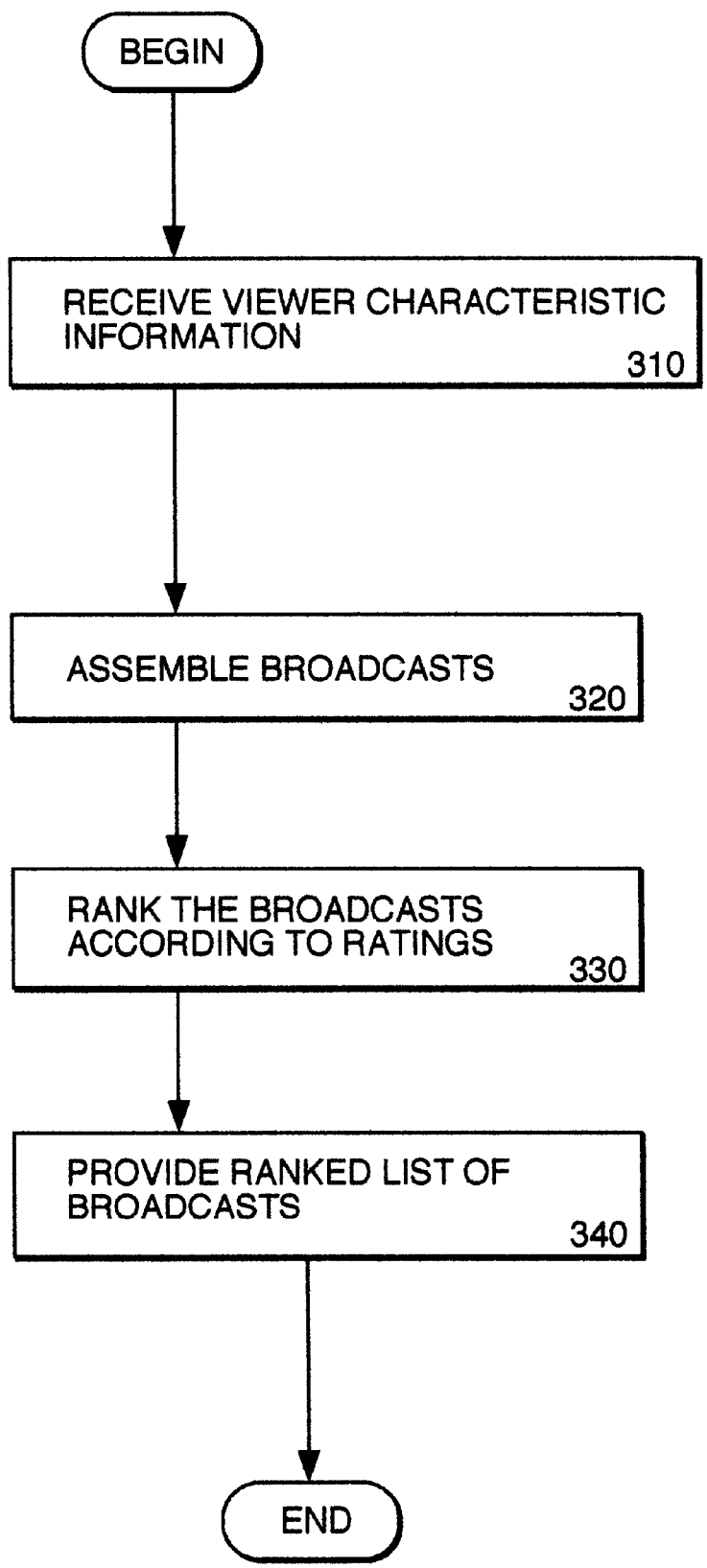

FIG. 4

NEWS     REVIEW

BROADCAST SYNOPSIS:

SEGMENT A OF PRESIDENT
    CLINTON'S NATIONAL ADDRESS
    FOLLOWING HIS GRAND JURY TESTIMONY

PLEASE RESPOND TO THE FOLLOWING:

— ARE YOU REGISTERED TO VOTE?     YES ☐   NO ☐

— POLITICAL AFFILIATION:
    DEMOCRATE    ☐
    REPUBLICAN   ☐
    OTHER        ☐

— GENDER     MALE ☐     FEMALE ☐

— AGE CATEGORY:          — DO YOU APPROVE OF
                              THE PRESIDENT'S PERFORMANCE
    UNDER 18    ☐     IN OFFICE?    YES ☐   NO ☐
    19 TO 25    ☐
    26 TO 35    ☐   — DO YOU APPROVE OF THE
    36 TO 45    ☐     PERFORMANCE OF SPECIAL
    46 TO 55    ☐     PROSECUTOR STARR?
    56 TO 65    ☐
    OVER 66     ☐     YES ☐   NO ☐

BROADCAST FEEDBACK:
    AFTER THE PRESIDENT'S NATIONAL ADDRESS,
    — YOUR APPROVAL OF THE PRESIDENT'S
      PERFORMANCE IN OFFICE HAS
        INCREASED.           ☐
        DECREASED.           ☐
        REMAINED THE SAME.   ☐

— YOUR APPROVAL OF THE RERFORMANCE
      OF SPECIAL PROSECUTOR STARR HAS
        INCREASED.           ☐
        DECREASED.           ☐
        REMAINED THE SAME.   ☐

[SUBMIT]
[CANCEL]

FIG. 5

NEWS REVIEW

BROADCAST SYNOPSIS:

SEGMENT A OF PRESIDENT CLINTON'S NATIONAL ADDRESS FOLLOWING HIS GRAND JURY TESTIMONY.

CATEGORIZED RATINGS:    (5,282 RESPONSES)

REGISTERED MALE DEMOCRATES AGES 19 TO 25 WHO APPROVE:

| | |
|---|---|
| X% | INCREASE |
| Y% | DECREASE |
| Z% | REMAINED THE SAME |

•
•
•

UNREGISTERED MALE REPUBLICAN'S AGES 56 TO 65 WHO DISAPPROVE

| | |
|---|---|
| M% | INCREASE |
| N% | DECREASE |
| O% | REMAINED THE SAME |

MOVIE REVIEW

TITLE: THE GREAT ADVENTURES OF MIGHTY SLOTH

GENRE: CHILDREN, ANIMATED, EDUCTIONAL

SYNOPSIS: THE LOVEABLE MIGHTY SLOTH TRAVELS (SLOWLY) THROUGH ENDANDGERED RAIN FORESTS OF SOUTH AMERICA.

PLEASE RESPOND TO THE FOLLOWING:

FOR VIEWERS UNDER 12

— GENDER    BOY: ☐    GIRL: ☐

— DID YOU LIKE THE MOVIE?    YES ☐    NO ☐

— WOULD YOU LIKE TO SEE MORE MIGHTY SLOTH ADVENTURES?    YES ☐    NO ☐

FOR PARENTS:

— DO YOU APPROVE OF THE EDUCATIONAL CONTENT OF THE MOVIE?    YES ☐    NO ☐

— DO YOU APPROVE OF THE ENTERTAINMENT VALUE OF THE MOVIE?    YES ☐    NO ☐

[SUBMIT]    [CANCEL]

FIG. 7

MOVIE  REVIEWS

PLEASE SELECT ONE OR MORE MOVIE GENRES

ANIMATED ☒          ADULT ☐
    CHILDREN ☒          DRAMA ☐
    COMEDY ☐          EDUCATIONAL ☒
    DOCUMENTARY ☐

PLEASE INDICATE AGE OF THE VIEWER:  [10]

[SUBMIT]    [CANCEL]

SEARCH RESULTS:

1. THE GREAT ADVENTURES OF MIGHTY SLOTH.
   THE LOVEABLE MIGHTY SLOTH TRAVELS
   (SLOWLY) THROUGH ENDANGERED RAIN
   FORESTS OF SOUTH AMERICA.    (723 RESPONSES)
       BOYS UNDER 12 - 83%    APPROVAL
       GIRLS UNDER 12 - 84%    APPROVAL
       PARENT APPROVAL OF EDUCATIONAL CONTENT - 77%
       PARENT APPROVAL OF ENTERTAINMENT VALUE - 92%

2. SAY HELLO TO MR. CRICKET

•
        •
        •

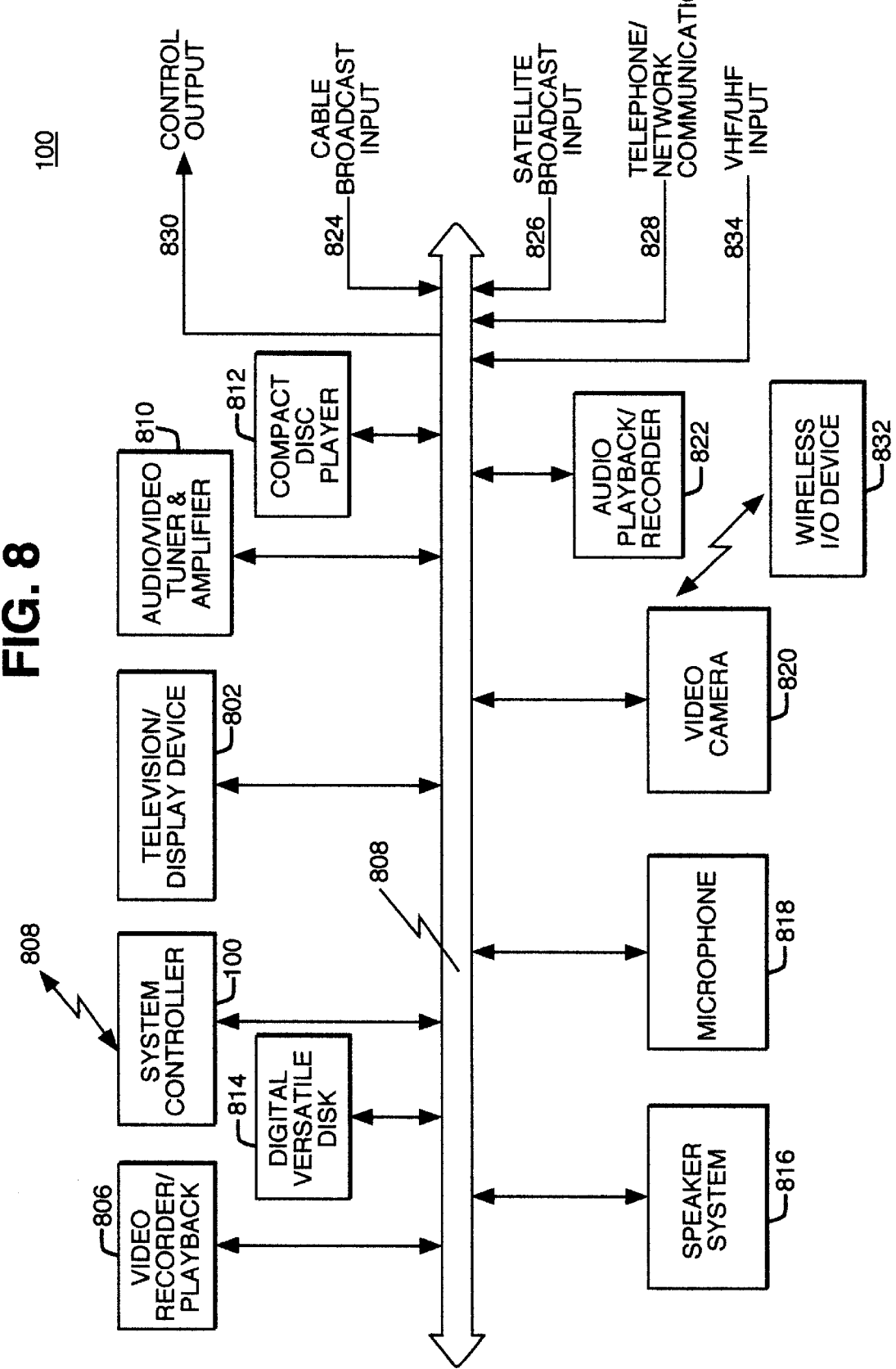

METHOD AND APPARATUS FOR COLLECTING AND PROVIDING VIEWER FEEDBACK TO A BROADCAST

BACKGROUND OF THE INVENTION

1. Field of the Invention

The present invention pertains to the field of broadcast systems. More particularly, this invention relates to the art of collecting and providing viewer feedback to a broadcast.

2. Background

The volume and variety of television, radio, and internet programming has increased considerably in recent years. For instance, digital cable systems and satellite antenna systems now offer hundreds of channels of programming twenty-four hours a day. Similarly, the Internet provides access to countless on-line interactive events. Even with a regular antenna, the airwaves in many markets are crammed full of dozens of television and radio channels. Sorting through all of the viewing, listening, and interactive options can be time consuming and frustrating.

A programming guide may be helpful, but most programming guides merely list broadcasts by time slot and channel. With hundreds of channels, including free channels, various categories of pay channels, pay per view channels, view on demand channels, etc., a programming guide can become very long and confusing. A viewer could spend a considerable amount of time reading a list of broadcasts for a given time slot and deciphering which broadcasts are actually available to the viewer.

All too often, a viewer may simply choose to flip through a few channels, or a great many channels as the case may be, until he or she finds a broadcast that he or she can tolerate. When the viewer loses interest, he or she may flip through some more channels, aimlessly looking for something of interest. Meanwhile, advertisers, television producers, and other programming providers want their broadcasts to reach the most receptive audiences possible. A viewer with hundreds of channels to choose from, who aimlessly flips through channels, can easily miss an appealing broadcast or advertisement. So, both viewers and programming providers want to be able to identify broadcasts that are likely to be of interest to particular viewers.

One way to predict how likely it is that a particular viewer will find a broadcast interesting is to examine feedback from previous viewers; especially previous viewers who have similar characteristics. For instance, if 85% of female viewers ages 25 to 35 highly recommend a broadcast, a significant portion of subsequent female viewers ages 25 to 35 are likely to enjoy the broadcast as well. For years, programming providers have used focus groups, surveys, Nielson ratings, etc. in an attempt to predict viewer preferences to make broadcasts appeal to the widest possible audience or to target certain audiences. These approaches have their limitations, however. For instance, they have done little to help viewers find the broadcasts that are most likely to be interesting to them. Therefore, both viewers and programming providers need an improved method and apparatus to collect and provide viewer feedback to a broadcast based on viewer characteristics.

SUMMARY OF THE INVENTION

The present invention provides an improved method and apparatus to collect and provide viewer feedback to broadcasts. According to one aspect of the present invention, a rating is generated for a broadcast by a server system. The rating is based at least in part on viewer feedback to the broadcast, and the rating indicates a likelihood of interest in the broadcast for potential subsequent viewers. Access to the rating is then provided so that predications can be made as to whether or not the broadcast will be of interest to potential subsequent viewers.

According to another aspect of the present invention, the rating is provided from the server system to an entertainment system, and the broadcast can be selected for viewing at the entertainment system based on the rating generated by the server system. In one embodiment, viewer the feedback is received at the entertainment system in response to a feedback questionnaire.

BRIEF DESCRIPTION OF THE DRAWINGS

Examples of the present invention are illustrated in the accompanying drawings. The accompanying drawings, however, do not limit the scope of the present invention. Like references in the drawings indicate similar elements.

FIG. 1 illustrates one embodiment of the present invention.

FIG. 2 demonstrates one embodiment of collecting and providing feedback.

FIG. 3 demonstrates another embodiment of providing feedback.

FIG. 4 illustrates one embodiment of a news review questionnaire.

FIG. 5 illustrates one embodiment of an output format based on the news review feedback.

FIG. 6 illustrates one embodiment of a movie review questionnaire.

FIG. 7 illustrates one embodiment of an output format based on the movie review feedback.

FIG. 8 illustrates one embodiment of a hardware system for entertainment system 100.

DETAILED DESCRIPTION

Figure 9:
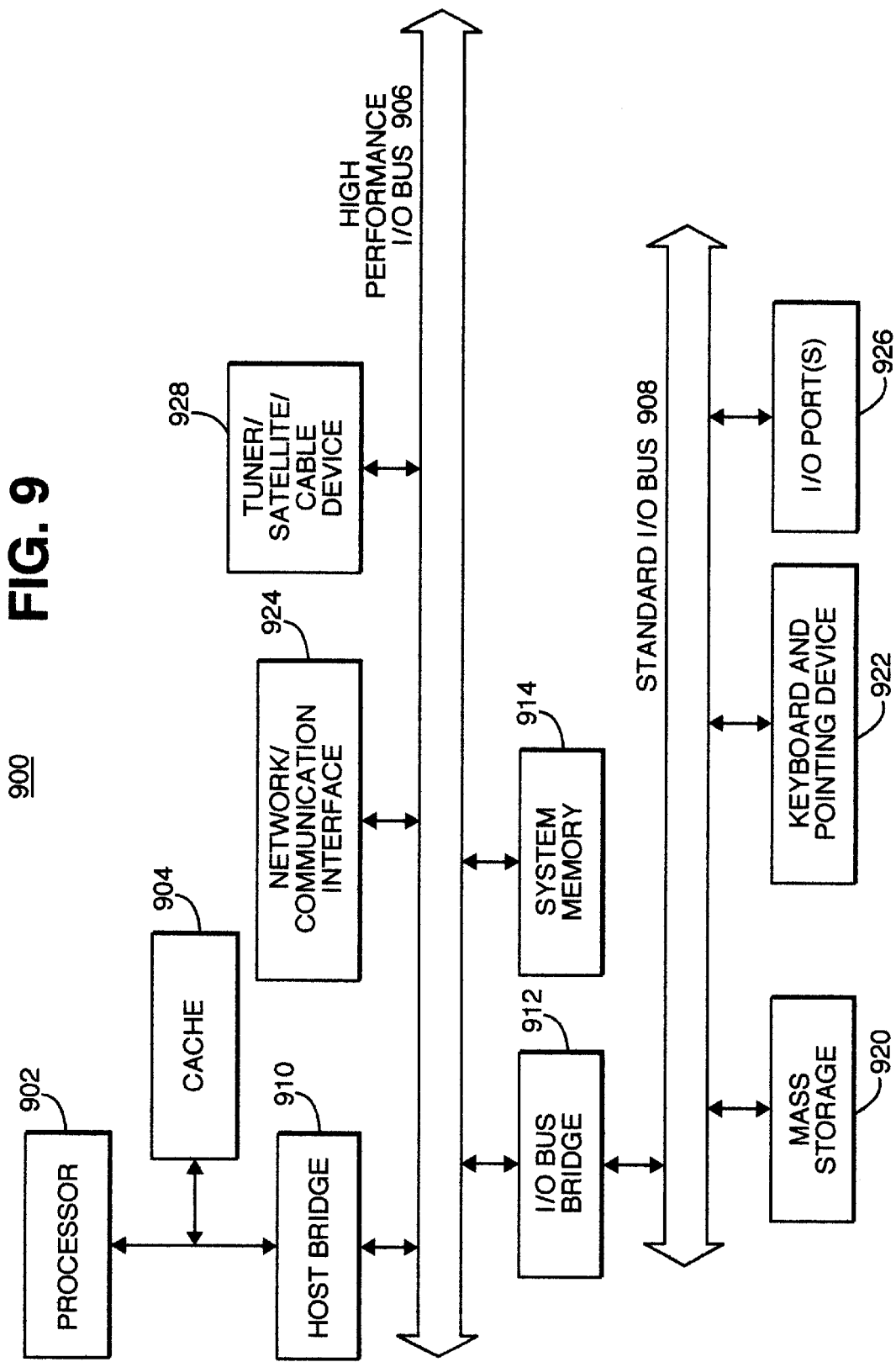
FIG. 9 illustrates one embodiment of a hardware system for system controller 110.

FIG. 1 illustrates one embodiment of the present invention. The present invention collects viewer feedback to a broadcast and generates a rating for the broadcast based at least in part on the viewer feedback and, in certain embodiments, characteristics of the viewer. The rating indicates how likely it is that potential subsequent viewers will be interested in the same broadcast or other broadcasts in a series. Rating information can be collected from multiple viewers and made available to potential subsequent viewers and programming providers. A broadcast may have several categorized ratings based on characteristics of the viewers. For instance, in one embodiment, a broadcast rating may indicate that 93% of children ages 4 to 6 of the 5279 who responded enjoyed the broadcast and would like to see it again, 23% of adults ages 25 to 35 of the 2497 who responded enjoyed the broadcast and would recommend it for children, 6% of adults over age 75 of the 238 who responded enjoyed the broadcast and would recommend it for children, etc.

As discussed below in more detail, entertainment system 100 of FIG. 1 represents a wide variety of audio, video, and interactive media systems. Under the control of system controller 110, entertainment system 100 collects viewer feedback from viewer 130 regarding a broadcast by providing questionnaire 115 and receiving viewer feedback 120. A broadcast may include a wide range of programming including a news segment, a situation comedy, a movie, a documentary, a commercial advertisement, an on-line interactive event, etc.

Entertainment system 100 sends the viewer feedback to programming guide server 170 over communications medium 150. Programming guide server 170 then generates a rating for the broadcast based at least in part on the feedback. The rating can also be based on feedback from additional viewers 180. The rating indicates a likelihood of interest in the broadcast for potential subsequent viewers. Ratings can be generated for multiple broadcasts and stored at programming guide server 170 where the ratings can be accessible to potential subsequent viewers and programming service providers 160 over communications medium 150.

Communications medium 150 represents a wide variety of media, including cable, optical fiber, satellite transmissions, telephone lines, radio frequency transmissions, and network communications such as over the Internet. Communications can also be digital and/or analog.

FIG. 2 demonstrates one embodiment of the present invention. First, in step 210, system controller 110 provides a feedback questionnaire to viewer 130. In one embodiment, questionnaire 130 is provided at any time during or shortly after a broadcast at the request of viewer 130. For instance, viewer 130 may have particularly enjoyed or hated a broadcast, so he or she may voluntarily take a moment to offer feedback. Alternately viewer 130 may be prompted to give feedback, so that viewer 130 can either give feedback or positively decline to give feedback.

In some embodiments, programming service providers 160 and/or programming guide server 170 may offer incentives to viewer 130 to encourage viewer 130 to give feedback. For instance, the more feedback programming guide server 170 receives, the more accurate the ratings are likely to be, and the more valuable the ratings are likely to be for programming service providers 160 and potential subsequent viewers. An incentive may be a small discount on service charges for each feedback response. Alternately, feedback incentives may be provided for only certain broadcasts, depending on how much feedback is needed or wanted. For a new broadcast, the broadcast could be provided to a test audience to obtain ratings prior to wide distribution. In which case, feedback may be required of test audience viewers or additional incentives may be offered.

In step 220, system controller 110 receives viewer feedback 120 in response to questionnaire 115. Questionnaire 115, and hence viewer feedback 120, can take several different forms, as discussed below with reference to FIGS. 4 and 6. For instance, questionnaire 115 can be specifically designed to gather particular information about a broadcast, or it can be a single generic question, such as "Did you like this broadcast?"

In step 230, system controller 110 provides the feedback to programming guide server 170 over communications medium 150. As discussed below with reference to FIGS. 4 and 6, the characteristic information can also be gathered along with the feedback to the broadcast. For instance, specific questions can be added to questionnaire 115 to collect particular characteristic information.

In alternate embodiments, viewer characteristics can also be stored at system controller 110 or programming guide server 170. Various means could be used to automatically identify viewer 130, for instance, using face recognition software. Alternately, questionnaire 130 could prompt viewer 130 for a some form of viewer identification such as an identification number, and the identification number could be used to retrieve an anonymous viewer characteristic file. A viewer characteristic file could store information such as age, gender, marital status, family size, geographic location, education level, income level, etc. It could also store information that may be useful to programming service providers 160, such as the hardware capabilities of entertainment system 100 and viewer 130's viewing habits, including channel preferences, viewing duration, types of Internet web sites visited, etc. A viewer characteristics file could also be updated over time as viewing habits change, the viewer grows older, component are added or deleted from entertainment system 100, a sport season beings and ends, etc. If a viewer's characteristics file were remotely accessible, the characteristic file could be used for the viewer at any of a number of different entertainment systems, for instance, at the viewers home, work, neighbor's house, a hotel, etc.

In step 240, programming guide server 170 generates a rating of the broadcast based at least in part on viewer feedback 120. The rating can also be based on the characteristic information about the viewer. The ratings, as discussed below with reference to FIGS. 5 and 7, can be used in several different forms. For instance, separate ratings may be generated for different categories of viewers.

In step 250, programming guide server 170 provides the ratings to potential subsequent viewers and programming providers 160. In one embodiment, ratings are downloaded to potential subsequent viewers along with programming information. For instance, one embodiment of programming guide server 170 provides programming guides to viewers on a regular basis, and ratings for some or all of the programs are provided along with the programming guide. In which case, the various entertainment systems, used by potential subsequent viewers including viewer 130 and additional viewers 180, may perform a variety of operations using the ratings information. Similarly, ratings information can be downloaded to programming service providers 160 on a regular basis. Programming service providers 160 may also perform a variety of operations using the ratings information.

In alternate embodiments, ratings information is stored centrally at programming guide server 170. In which case, programming guide server 170 performs various operations using the ratings information and only provides the results of the operations to potential subsequent viewers and/or programming service providers 160. Ratings information may also be provided in real time. For instance, a viewer's screen may include a feedback meter that is repeatedly updated as ratings are generated from feedback provided by other viewers, for instance, in the viewer's community. In which case, the viewer could see how the other viewers are responding to a program as the viewer is watching it.

FIG. 3 demonstrates one embodiment of providing ratings to potential subsequent viewers. The method could be performed centrally by programming guide server 170 or locally by the various entertainment systems of potential subsequent viewers. In the illustrated embodiment, a potential viewer is consulting a programming guide provided by programming guide server 170. In step 310, viewer characteristic information is received. The viewer may provide this information in a number of different ways, including menu selections, voice commands, etc. Alternately, the information may be stored in a viewer characteristic file, stored locally or remotely. A viewer characteristic file may be selected automatically, based on face recognition for instance, or the viewer may be prompted to enter some form of identification. Viewer characteristic information may also be a combination of retrieved data and user provided data. For instance, the viewer may be in the mood for a drama or a situation comedy. In which case, the viewer may input his or her preference, and a file may be retrieved that includes a list of the viewer's favorite dramas and situation comedies, as well as other characteristic information.

In step 320, the respective system controller or programming guide server 170 assembles a list of broadcasts based on a comparison of broadcast classification data and viewer characteristics. The broadcast classification data, as discussed below with reference to FIG. 7, can include a channel and time slot, a title, a synopsis, a parental guidance warning, etc. For instance, the characteristic information may include a list of programming sources or channels that are available to the particular user at the particular entertainment system. In which case, the list of broadcasts may include only those broadcasts that are available. For example, if a viewer's entertainment system does not receive satellite broadcasts, then satellite broadcasts can be left off the list.

Assembling the list can be based on numerous additional characteristics. In one embodiment, a face recognition utility could be used to automatically retrieve viewer characteristic files for a number of concurrent viewers and automatically cross-reference the characteristics. For instance, if children are among the viewers in the room, characteristic files for the children may instruct the system controller to lock out broadcasts having adult content that would not be suitable for children.

In one embodiment, however, all broadcasts currently being aired, soon to be aired, currently available on pay per view or view on demand, etc. are listed even if the viewer does not have access to all of the broadcasts. For instance, inaccessible broadcasts could be listed in a different type face than accessible broadcasts. In this situation, a viewer may be encouraged to purchase access to more programming sources in the future if the viewer knows what he or she is missing on those channels.

Then, in step 330, each broadcast in the list can be ranked according to viewer characteristics and ratings. The ratings categories can be very detailed. For instance, a category could be limited to viewers who characteristically enjoy the same dramas and situation comedies as the potential viewer. The program with the highest rating in the category is ranked highest. Numerous additional viewer characteristics could also be used to identify which rating category to use. For instance, the rating categories could include viewers ages 45 to 55, viewers in metropolitan areas of Europe, viewers who play role-playing games on the Internet, etc. The possibilities for viewer characteristic categories are virtually limitless.

Viewer characteristics for multiple simultaneous viewers can also be cross-referenced. Various aggregation techniques could be used to combine ratings. For instance, in one embodiment, if a viewer's characteristics match several ratings categories, the weighted average of the ratings could be used for a particular broadcast. In one example, viewer characteristics match three categories. In category A, 50% of the 500 responses were positive for the particular broadcast. In category B, 75% of the 2000 responses were positive. In category C, 90% of the 200 responses were positive. For this particular set of ratings categories, the weighted average for the broadcast is 71.481% positive.

Two simultaneous viewers, however, may have only categories A and C in common. In which case, the weighted average for both viewers together for the particular broadcast is 61.429% positive. If simultaneous viewers have no ratings categories in common, broadcasts could be ranked and listed separately for each viewer, or ranked separately but listed together in different type faces.

Once all the broadcasts have been ranked, the ranked list of broadcasts can be provided in step 340. The first broadcast on the list is intended to be the most likely broadcast that is of interest to the viewer. Thus, the viewer does not have to sort through a vast array of programming choices.

Similarly, programming service providers 160 have more information to predict which broadcasts will appeal to particular target audiences. In one embodiment, programming service providers 160 have access to anonymous viewer characteristic information. In which case, programming service providers can target advertise broadcasts directly to viewers for whom the broadcast ranks highly. For instance, when a viewer downloads a programming guide, the guide may include a tailor-made list of broadcasts that are likely to appeal to the specific viewer. Separate lists could be provided for each viewer who uses a particular entertainment system.

FIG. 4 illustrates one embodiment of a questionnaire. In the illustrated embodiment, the questionnaire is designed to collect specific types of information regarding a news segment. Here, the news segment is part of a national address given by the President of the United States. In one embodiment, the questionnaire may be automatically provided at the end of the broadcast to a test audience in order to prompt the test audience for feedback. Alternately, a viewer of the broadcast may volunteer to provide feedback. In which case, the viewer may press a button on a remote control or a keyboard, or issue a voice command, which interrupts system controller 110.

In response, system controller 110 identifies the broadcast. In one embodiment, the broadcast currently being viewed is identified. Alternately, the broadcast can be identified by prompting the viewer to identify the broadcast from a list of recently viewed broadcasts. Then system controller 110 can access a storage medium to retrieve a specific questionnaire, if one exists, or a generic questionnaire for the broadcast. The storage medium may store hundreds of questionnaires locally which were downloaded along with a programming guide from programming guide server 170. Alternately, system controller 110 may access programming guide server 170 to download questionnaires as requests for feedback are received.

In the illustrated embodiment, the specific questionnaire includes a broadcast synopsis so that the viewer can verify he or she is providing feedback to the correct broadcast. The questionnaire also includes questions for gathering characteristic information in addition to feedback questions. Once the questionnaire is completed and submitted, the information can be sent to programming guide server 170. Additional characteristic information may also be sent, for instance, from a viewer characteristics file. In certain embodiments, several responses may be stored for several broadcasts before being sent to programming guide server 170.

FIG. 5 illustrates one embodiment of an output format that may be used by a programming service provider. The ratings are categorized according to certain characteristics that are important to the programming provider. For instance, the results may help a politically motivated programming provider to decide whether or not to distribute the broadcast to a wider audience, and if so, to which audience the broadcast should be targeted based on viewer characteristics.

The feedback can also be used to make changes in the presentation before the broadcast is aired again or made available to a wider audience. In one embodiment, feedback could be collected from viewers during a live presentation. In which case the ratings could be displayed to the presenter or the writer of the presentation in, for instance, a bar graph format so the ratings would be easy to read. Then, based on the feedback, the presenter or writer may choose to make mid-course content changes.

FIG. 6 illustrates one embodiment of a movie review questionnaire. The questionnaire includes title, genre, and synopsis information, all of which could be taken from a programming guide, and could be included in a generic movie review questionnaire. The illustrated questionnaire, however, includes specific questions for this particular movie. For instance, the programming providers want to know if viewers are interested in more movies about the same character, and different questions are posed to children than parents.

FIG. 7 illustrates one output format using the ratings generated from the questionnaire of FIG. 6. At the top portion of the screen, a viewer indicates some characteristics. Here, the viewer is interested in animated children's stories with some educational content. The viewer is 10 years old. Additional characteristic information may be supplied from a viewer characteristics file. The lower portion of the screen lists search results from among the broadcasts currently available. The list includes the title and synopsis of each broadcast as well as ratings information. Based on the characteristics of the viewer, the first broadcast in the list is intended to be the most likely to be interesting to the viewer.

In alternate embodiments, the questionnaire and output screens can be displayed in pop-up windows, full screen displays, side-bar displays, etc. The questionnaire and output screens may include many additional forms of broadcast classification data such as a broadcast identification number, the producer, the distributor, the length of the broadcast, a parental guidance warning, etc. The broadcast identification information may be downloaded with a programming guide or retrieved individually from programming guide server 170.

FIG. 8 is a block diagram illustrating the system components of an exemplary entertainment system 100 of FIG. 1. System 100 includes television/display device 802, video recorder/playback device 806, digital video disk (DVD, also referred to as digital versatile disk) recorder/playback device 814, audio/video tuner and/or amplifier 810, audio playback/recorder device 822, and compact disc (CD) player 812, all coupled to a common input/output (I/O) bus 808. It is to be appreciated that the use of the common I/O bus 808 is for ease of explanation in the diagram only, and that a number of alternative means of routing input and output signals may be beneficially employed. For example, audio input and output could be routed with an appropriate number of independent audio "patch" cables, video signals may be routed with independent coaxial cables, and control signals may be routed along a two-wire serial line, or through infrared (IR) communication signals or radio frequency (RF) communication signals. By way of further example, audio, video, and/or control signals may also be routed along one or more buses in accordance with the Universal Serial Bus Specification, Revision 1.0 (Jan. 15, 1996), or the High Performance Serial Bus IEEE Standard 1394, IEEE std. 1394–1995, draft 8.0v3, approved Dec. 12, 1995.

In addition, system 100 includes speaker system 816, microphone 818, video camera 820 and a wireless input/output control device 832. In one embodiment, wireless I/O control device 832 is an entertainment system remote control unit which communicates with the components of system 100 through IR signals. In another embodiment, wireless I/O control device 832 may be a wireless keyboard and/or cursor control device that communicates with the components of system 100 through IR signals or RF signals. In yet another embodiment, wireless I/O control device 832 may be an IR or RF remote control device similar in appearance to a typical entertainment system remote control with the added feature of a track-ball or other cursor control mechanism that allows a user to position a cursor on a display of system 100.

At the core of system 100 is system controller 110 incorporated with the features of the present invention as discussed above and configured to control a variety of features associated with the system components. As depicted, system controller 110 is coupled to each of the system components, as necessary, through I/O bus 808. In one embodiment, in addition to or in place of I/O bus 808, system controller 110 may be configured with a wireless communications transmitter (or transceiver), which is capable of communicating with the system components via IR signals or RF signals 808'. Regardless of the control medium, system controller 110 is configured to control each of the entertainment system components of system 100, although it is understood that each of the components may be individually controlled with wireless I/O device 832.

System controller 110 retrieves and stores entertainment programming information available from a wide variety of sources. During operation of system 100, system controller 110 dynamically configures the operating parameters of system 100 and offers additional value added features to enhance the user's enjoyment of system 100, such as features of the present invention as discussed above. In one embodiment, system controller 110 may be a computer system incorporated with the teachings of the present invention, as will be discussed in further detail below. In another embodiment, system controller 110 may be a "set-top" box endowed with the necessary processing power and incorporated with the teachings of the present invention. Regardless of the particular embodiment, system controller 110 may also be referred to as a "convergence system" designed to integrate the world of entertainment systems and computing platforms to achieve the beneficial results such as the present invention.

Although the present invention is described in the context of the exemplary embodiments presented in the figures and based on the descriptions, those skilled in the art will appreciate that the present invention is not limited to these embodiments and may be practiced in a variety of alternate embodiments. Accordingly, the innovative features of the present invention may be practiced in a system of greater or lesser complexity than that of the system depicted in FIG. 8. By way of example, devices may be added to system 100, or devices (e.g., video camera 820, microphone 818, DVD recorder/playback device 814, etc.) may be removed from system 100.

As illustrated in FIG. 8, system 100 can be configured to receive audio/video programming input from a wide variety of sources. In one embodiment, system 100 receives programming input from any or all of the following sources: cable broadcast 824, satellite broadcast 826 (e.g., via a satellite dish), very high frequency (VHF) or ultra high frequency (UHF) radio frequency communication of the broadcast networks 834 (e.g., via an aerial antenna), and/or the telephone/computer network interface 828. Further, it will be appreciated by those skilled in the art that cable broadcast input 824, satellite broadcast input 826 and VHF/UHF input 834 may include analog and/or digital programming. Additionally, audio/video programming may be received from a CD-ROM, DVD, or other digital or analog storage device via a playback device of system 100 (e.g., DVD recorder/playback device 814). The Internet, an entertainment network, or other network may also provide audio/video programming, via, for example, interface 828.

In addition to programming input, system 100 is also configured with a number of general purpose control outputs 830 which may be configured to control any number of devices. In one embodiment, for example, as system controller 804 configures system 100 to display a movie, it may also dim the lights in the room to a predetermined level to further enhance the viewing environment. Control circuitry which allows a computing device to control, for example, lighting, thermostat settings, and other household appliances (via, for example, the electrical wiring in a house) are well known in the art and thus will not be described further.

Except for the incorporated teachings of the present invention as described above, system controller 110 is intended to represent a broad category of computing devices known in the art. An example of such a computing device is a desktop computer system equipped with a high performance microprocessor(s), such as the Pentium® processor, Pentium® Pro processor, or Pentium® II processor manufactured by and commonly available from Intel Corporation of Santa Clara, Calif. Another example of such a computing device is an Internet "appliance" device, such as a WebTV™ Internet Terminal available from Sony Electronics Inc. of Park Ridge, N.J., or Philips Consumer Electronics Company of Knoxville, Tenn. It is to be appreciated that the housing size and design for system controller 110 may be altered, allowing it to better visually fit into system 100.

It is also to be appreciated that the several entertainment system components depicted in FIG. 8 can be beneficially combined. By way of example, system controller 110 could be integrated into television/display device 802, DVD recorder/playback device 814, or audio/video tuner and amplifier 810.

FIG. 9 illustrates one embodiment of a computing device suitable for use with the present invention. According to one implementation, system controller 110 of FIG. 1 is a computing device 900 of FIG. 9. In the illustrated embodiment of FIG. 9, device 900 includes processor 902 and cache memory 904 coupled to each other as shown. Additionally, device 900 includes high performance input/output (I/O) bus 906 and standard I/O bus 908. Host bridge 910 couples processor 902 to high performance I/O bus 906, whereas I/O bus bridge 912 couples the two buses 906 and 908 to each other. Coupled to bus 906 are network/communication interface 924 and system memory 914. Coupled to bus 908 is mass storage 920, keyboard and pointing device 922, and I/O ports 926. Collectively, these elements are intended to represent a broad category of hardware systems, including but not limited to general purpose computer systems based on the Pentium® processor, Pentium® Pro processor, or Pentium® II processor, manufactured by Intel Corporation of Santa Clara, Calif.

In one embodiment, various electronic devices are also coupled to high performance I/O bus 906. As illustrated, analog tuner/digital satellite/cable devices 928, are also coupled to high performance I/O bus 906 to allow device 900 to "tune" to various programming input channels.

These elements 902–928 perform their conventional functions known in the art. In particular, network/communication interface 924 is used to provide communication between device 900 and any of a wide range of conventional networks, such as an Ethernet, token ring, the Internet, etc. It is to be appreciated that the circuitry of interface 924 is dependent on the type of network the device 900 is being coupled to.

Mass storage 920 is used to provide permanent storage for the data and programming instructions to implement the above described functions, whereas system memory 914 is used to provide temporary storage for the data and programming instructions when executed by processor 902. I/O ports 926 are one or more serial and/or parallel communication ports used to provide communication between additional peripheral devices which may be coupled to device 900.

It is to be appreciated that various components of device 900 may be re-arranged. For example, cache 904 may be on-chip with processor 902. Alternatively, cache 904 and processor 902 may be packaged together as a "processor module", with processor 902 being referred to as the "processor core". Furthermore, certain implementations of the present invention may not require nor include all of the above components. For example, mass storage 920, keyboard and pointing device 922, and/or network/communication interface 924 may not be included in device 900. Additionally, the peripheral devices shown coupled to standard I/O bus 908 may be coupled to high performance I/O bus 906; in addition, in some implementations only a single bus may exist with the components of device 900 being coupled to the single bus. Furthermore, additional components may be included in device 900, such as additional processors, storage devices, buses, or memories.

In one embodiment, the present invention is implemented as a series of software routines run by device 900 of FIG. 9. These software routines comprise a plurality or series of instructions to be executed by a processor in a hardware system, such as processor 902 of FIG. 9. Initially, the series of instructions are stored on a storage device, such as mass storage 920. It is to be appreciated that the series of instructions can be stored using any conventional storage medium, such as a diskette, CD-ROM, magnetic tape, DVD, laser disk, ROM, Flash memory, etc. It is also to be appreciated that the series of instructions need not be stored locally, and could be received from a remote storage device, such as a server on a network, via network/communication interface 924. The instructions are copied from the storage device, such as mass storage 920, into memory 914 and then accessed and executed by processor 902. In one implementation, these software routines are written in the C++ programming language. It is to be appreciated, however, that these routines may be implemented in any of a wide variety of programming languages.

In alternate embodiments, the present invention is implemented in discrete hardware or firmware. For example, one or more application specific integrated circuits (ASICs) could be programmed the functions of the present invention. By way of another example, the present invention can be implemented in one or more ASICs of an additional circuit board for insertion into hardware system 900 of FIG. 9.

In one embodiment, hardware system 900 includes control circuitry to retrieve a questionnaire from system memory 914, mass storage 920, or programming guide server 170 over network/communication interface 924. Processor 902 or some other form of hardware device like a digital signal processor (DSP) or one or more ASICs may comprise the control circuitry. The questionnaire is retrieved in response to a feedback request. As discussed above, a feedback request may be generated automatically, for instance at the end of a particular broadcast, or on demand by a viewer. The questionnaire can be provided to viewer 130 over I/O ports 926 using a viewer interface displayed on television/display device 802. The user interface may also be provided over speaker system 816, and viewer input may be received from a cursor control device on television/display device 802, a keypad, for instance on wireless I/O device 832, or voice recognition through microphone 818.

After reading the forgoing, those skilled in the art will recognize that a number of alternative embodiments are also enabled. For instance, programming guide server 170 may be a distributed application with a different server for each of several different regions or entertainment systems. In another embodiment, programming guide server 170 could also be combined with programming service providers 160.

In certain embodiments, ratings may not always be publicly available, depending on the type of broadcast. For instance, ratings for a commercial advertisement may only be available to the programming provider who aired the commercial. Furthermore, programming providers may be able to request that particular ratings be made unavailable. For instance, if ratings are very bad, it may be better to air a broadcast with no ratings rather than bad ratings.

Thus, a method and apparatus to collect and provide feedback to a broadcast is described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. A method comprising:
   presenting a broadcast to a viewer;
   receiving viewer feedback to the broadcast including providing a questionnaire in response to a request from a viewer to provide feedback;
   generating a rating of the broadcast based at least in part on the received viewer feedback to the broadcast, the rating indicating a likelihood of interest in the first broadcast for potential subsequent viewers; and
   providing the rating of the broadcast to potential subsequent viewers.

2. The method of claim 1 wherein receiving viewer feedback comprises receiving viewer feedback after a broadcast.

3. The method of claim 1 wherein the request from a viewer comprises an identification of one from among a list of recently viewed broadcasts.

4. The method of claim 1 wherein receiving viewer feedback comprises receiving answers to a questionnaire, the questionnaire including questions that are specific to the broadcast.

5. The method of claim 1 further comprising offering an incentive to the viewer to encourage the viewer to provide viewer feedback.

6. The method of claim 1 wherein receiving viewer feedback comprises receiving viewer feedback at a programming guide server from a system controller of a viewer entertainment system.

7. The method of claim 1 further comprising receiving viewer characteristic information along with the viewer feedback.

8. The method of claim 7 further comprising storing the viewer characteristic information in a system controller of a viewer entertainment system.

9. The method of claim 7 wherein the viewer characteristic information includes hardware capabilities of a viewer entertainment system.

10. The method of claim 1 wherein the rating comprises an indication of a proportion of viewer feedback which is positive toward the broadcast.

11. The method of claim 7 wherein generating a rating comprises generating a rating using the viewer characteristic information to generate separate ratings for different categories of viewers.

12. The method of claim 1 further comprising providing the rating of the broadcast to programming providers.

13. The method of claim 1 wherein providing the rating comprises providing the rating along with a programming guide.

14. The method of claim 1 wherein providing the rating comprises repeatedly updating provided ratings as viewer feedback is received.

15. The method of claim 1 further comprising presenting a programming guide of available broadcasts to a viewer wherein the available broadcasts are ranked based on the rating.

16. The method of claim 7 further comprising:
   assembling a list of available broadcasts using viewer characteristic information for a selected viewer;
   ranking the available broadcasts in the list based on the rating for each respective broadcast; and
   presenting a programming guide showing the ranked list to the selected viewer.

17. The method of claim 7 further comprising presenting a programming guide of available broadcasts to a viewer wherein the available broadcasts are ranked based on the rating and on the viewer characteristic information.

18. The method of claim 7 further comprising presenting a programming guide of available broadcasts to a viewer wherein the available broadcasts are ranked based on viewer characteristic information.

19. A method comprising:
   receiving viewer feedback to a broadcast from a plurality of different viewers of the broadcast including providing a questionnaire in response to a request from a viewer to provide feedback;
   generating a rating of the broadcast based at least in part on the received viewer feedback to the broadcast, the rating indicating a likelihood of interest in the first broadcast for potential subsequent viewers; and
   providing the rating of the broadcast through an electronic communications device for display to potential subsequent viewers of the broadcast.

20. The method of claim 19 wherein receiving viewer feedback comprises receiving answers to a questionnaire, the questionnaire including questions that are specific to the broadcast.

21. The method of claim 19 further comprising offering an incentive to the viewer to encourage the viewer to provide viewer feedback.

22. The method of claim 19 further comprising receiving viewer characteristic information along with the viewer feedback.

23. The method of claim 22 wherein the viewer characteristic information includes hardware capabilities of a viewer entertainment system.

24. The method of claim 22 wherein generating a rating comprises generating a rating using the viewer characteristic information to generate separate ratings for different categories of viewers.

25. The method of claim 19 wherein providing the rating comprises providing the rating along with a programming guide.

26. The method of claim 19 wherein providing the rating comprises repeatedly updating provided ratings as further feedback from additional ones of the plurality of viewers is received.

27. The method of claim 19 further comprising presenting a programming guide of available broadcasts to a viewer wherein the available broadcasts are ranked based on the rating.

28. The method of claim 22 further comprising:
assembling a list of available broadcasts using viewer characteristic information for a selected viewer;
ranking the available broadcasts in the list based on the rating for each respective broadcast; and
presenting a programming guide showing the ranked list to the selected viewer.

29. The method of claim 22 further comprising presenting a programming guide of available broadcasts to a viewer wherein the available broadcasts are ranked based on viewer characteristic information.

30. A machine-readable medium having stored thereon data representing sequences of instructions which, when executed by a machine, cause the machine to perform operations comprising:
presenting a broadcast to a viewer;
receiving viewer feedback to the broadcast including providing a questionnaire in response to a request from a viewer to provide feedback;
generating a rating of the broadcast based at least in part on the received viewer feedback to the broadcast, the rating indicating a likelihood of interest in the first broadcast for potential subsequent viewers; and
providing the rating of the broadcast to potential subsequent viewers.

31. The medium of claim 30 wherein the instructions causing the machine to perform operations comprising generating a rating further comprise instructions causing the machine to perform operations comprising generating a rating using viewer characteristic information to generate separate ratings for different categories of viewers.

32. The medium of claim 30, the instructions causing the machine to perform operations further comprising:
assembling a list of available broadcasts using viewer characteristic information for a selected viewer;
ranking the available broadcasts in the list based on the rating for each respective broadcast; and
presenting a programming guide showing the ranked list to the selected viewer.

33. A machine-readable medium having stored thereon data representing sequences of instructions which, when executed by a machine, cause the machine to perform operations comprising:
receiving viewer feedback to a broadcast from a plurality of different viewers of the broadcast;
generating a rating of the broadcast based at least in part on the received viewer feedback to the broadcast, the rating indicating a likelihood of interest in the first broadcast for potential subsequent viewers and the rating using viewer characteristic information to generate separate ratings for different categories of viewers; and
providing the rating of the broadcast through an electronic communications device for display to potential subsequent viewers of the broadcast.

34. The medium of claim 33 wherein the instructions causing the machine to perform operations comprising providing the rating further comprise instructions causing the machine to perform operations comprising providing the rating along with a programming guide.

35. The medium of claim 33, the instructions causing the machine to perform operations further comprising:
assembling a list of available broadcasts using viewer characteristic information for a selected viewer;
ranking the available broadcasts in the list based on the rating for each respective broadcast; and
presenting a programming guide showing the ranked list to the selected viewer.

36. An entertainment system controller comprising:
a storage medium to store a questionnaire regarding a broadcast that is presented to a viewer on a display device;
control circuitry to provide a feedback questionnaire to a viewer of the broadcast, the control circuitry retrieving the questionnaire from the storage medium in response to a request from the viewer;
a viewer interface to receive viewer feedback to the broadcast based on the feedback questionnaire; and
a communications interface to provide the viewer feedback to the broadcast to a server system and to receive ratings from the server system regarding other available broadcasts based on viewer feedback from other viewers, the ratings indicating a likelihood of interest in the available broadcasts for the viewer,
wherein the control circuitry further provides the ratings regarding other available broadcasts to the viewer.

37. The entertainment system controller of claim 36 wherein the communications interface comprises at least one of a local area network, a wide area network, internet, cable television line, twisted pair line, fiber optic line, or radio frequency communications interface.

38. The entertainment system controller of claim 36 wherein the communications interface provides viewer characteristic information to the server system along with the viewer feedback.

39. The entertainment system controller of claim 36 further comprising a register containing information regarding the entertainment system of the viewer and wherein the communications interface provides hardware capabilities information from the register to the server system along with the viewer feedback.

40. The entertainment system controller of claim 36 further comprising a storage medium to store information regarding available broadcasts and wherein the control circuitry
assembles a list of available broadcasts using viewer characteristic information for a selected viewer;
ranks the available broadcasts in the list based on the rating for each respective broadcast; and
presents a programming guide showing the ranked list to the selected viewer.

41. An entertainment server system comprising:
a communications interface to receive viewer feedback to a broadcast from a plurality of different viewers of the broadcast, the communications interface receiving viewer characteristic information along with the viewer feedback; and
a processor to generate a rating of the broadcast based at least in part on the received viewer feedback to the broadcast, the rating indicating a likelihood of interest in the first broadcast for potential subsequent viewers, the rating being generated using the viewer characteristic information to generate separate ratings for different categories of viewers, wherein the communications interface provides the rating of the broadcast to viewer entertainment systems for display to potential subsequent viewers of the broadcast.

42. The system of claim 41 further comprising a programming guide server to provide a programming guide to viewer entertainment systems through the communications interface the broadcasts of the programming guide being associated with a rating.

43. The system of claim 41 further comprising a storage medium to store information regarding available broadcasts and wherein the control circuitry assembles a list of available broadcasts using viewer characteristic information for a selected viewer;

ranks the available broadcasts in the list based on the rating for each respective broadcast; and wherein the communications interface provides a programming guide showing the ranked list to an entertainment system of the selected viewer.

* * * * *